United States Patent [19]

Orth

[11] 4,184,334

[45] Jan. 22, 1980

[54] CLOSED CENTER DRAFT CONTROL VALVE

[75] Inventor: Harold R. Orth, Hinsdale, Ill.

[73] Assignee: International Harvester Company, Chicago, Ill.

[21] Appl. No.: 940,813

[22] Filed: Sep. 11, 1978

[51] Int. Cl.² ............................................. F16H 39/46
[52] U.S. Cl. ...................................... 60/445; 60/484; 91/461; 251/122
[58] Field of Search ......................... 60/420, 445, 484; 91/461; 251/28, 29, 122

[56] References Cited

U.S. PATENT DOCUMENTS

| | | | |
|---|---|---|---|
| 2,938,346 | 5/1960 | Gratzmuller | 91/461 X |
| 3,945,208 | 3/1976 | O'Connor | 60/484 X |

*Primary Examiner*—Edgar W. Geoghegan
*Attorney, Agent, or Firm*—Douglas W. Rudy; Ronald C. Kamp; F. David AuBuchon

[57] ABSTRACT

A variable displacement pump supplies fluid to the single acting draft control cylinder of an agricultural tractor through a valve for controlling flow to and from the draft control cylinder. The valve houses a control rod activated valve spool that when displaced allows fluid to unseat a check valve between the spool valve and the draft control cylinder.

Fluid is exhausted from the draft control cylinder when the control rod causes unseating of a main poppet by unseating a pilot valve in the main poppet. Fluid being exhausted from the draft control cylinder then passes through the valve to tank.

13 Claims, 4 Drawing Figures

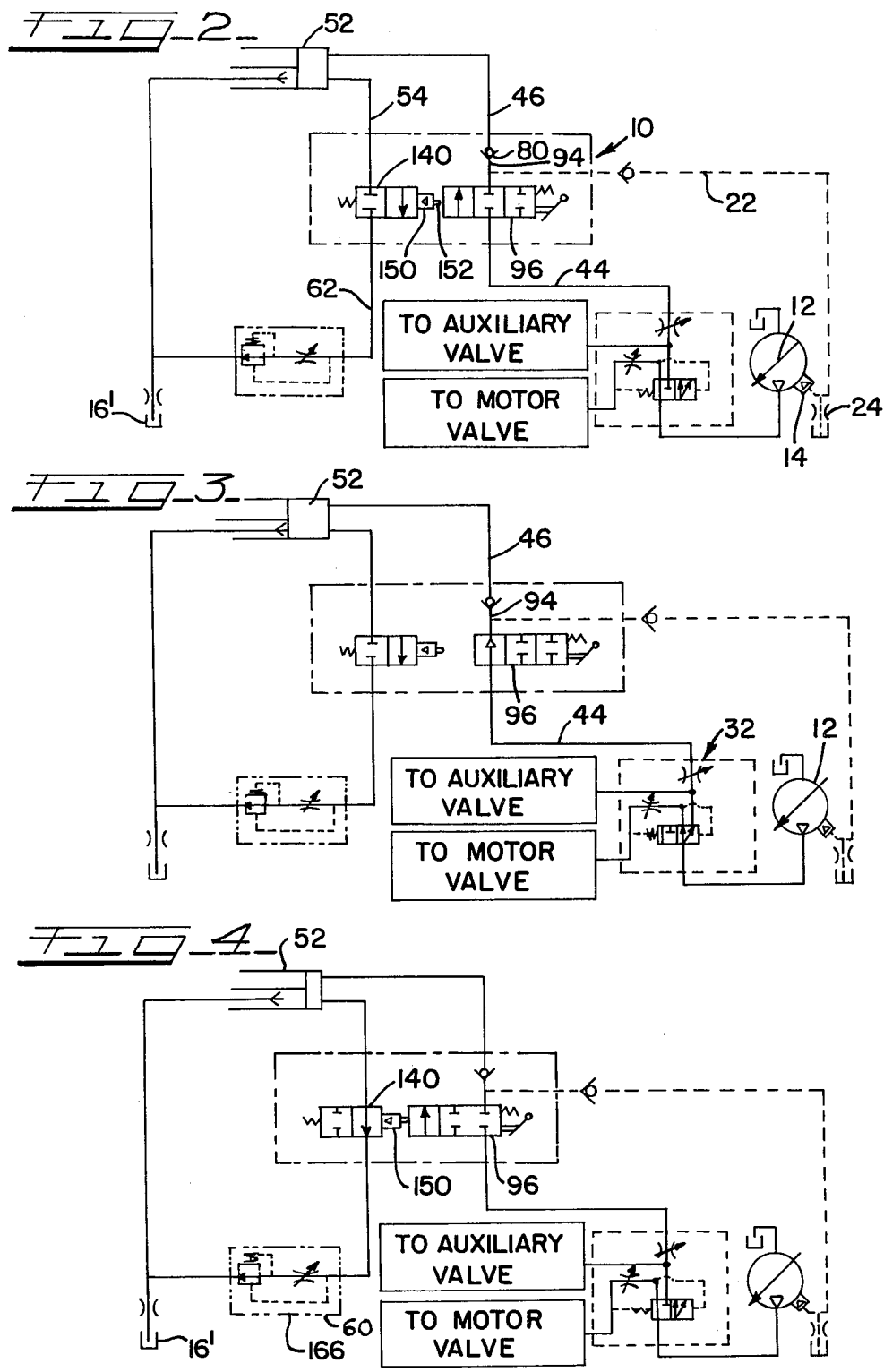

CLOSED CENTER DRAFT CONTROL VALVE

BACKGROUND OF THE INVENTION

1. Field of the Invention

The invention is a control valve for use in controlling the raise rate and the lowering rate of a draft control cylinder in an agricultural tractor hitch system. The valve is a closed center valve.

2. Description of the Prior Art

The closed center draft control valve presented in this specification is designed for use in a pressure and flow compensated draft control system. The draft control valve is based on the prior art open center draft control valve body that included similar but operationally different components. The prior art valve would not operate in the pressure and flow compensated environment that the instant invention is designed to operate in. Furthermore, the principles of operation of the newly developed and herein presented closed center draft control valve and the prior art open center draft control valve are completely different.

It is expected that there are hydraulic systems in the extensive array of prior art devices that show spool valves, pilot operated poppet valves and manual poppet valves in various assemblages. However, the inventor of the system presented herein is not aware of the existence of a prior art valve that utilizes the components of this invention in an assembly having the operating characteristics and advantages of this invention.

It is amongst the objects of this invention to provide a closed center draft control valve that can closely meter flow of hydraulic fluid from a variable displacement pump to a draft control cylinder through a valve spool that can be feathered.

It is also an object of this invention to provide a closed center draft control valve that can closely meter the evacuation of fluid from a draft control cylinder.

Another advantage of this draft control valve is that it eliminates the necessity of a pump and an unloading valve in a draft control system. This thereby reduces cost of the draft control system and reduces the number of necessary assemblies.

Another object of the invention is to have return flow exhausted from the draft control cylinder not be controlled by the spool valve that is used to direct fluid to the draft control cylinder thus saving cost through decreased complexity of the draft control valve body.

Also an object of this invention is to provide a fine control of the rate of fluid being exhausted through the use of pilot valve and feathering through the use of a pilot controlled poppet valve.

SUMMARY OF THE INVENTION

A closed center draft control valve has a a mechanically operated spool valve for controlling input flow being directed to a draft control cylinder. An anti-leakdown check valve is interposed in the passage between the spool valve and the outlet orifice of the draft control valve to prevent draft control cylinder pressure from effecting the displacement of a flow and pressure compensated variable displacement motor.

The draft control valve also controls the rate at which fluid is exhausted from the draft control cylinder by means of a pilot operated poppet valve that is mechanically unseated by an extended probe of the control valve. Fine control of the rate of release is facilitated through the minute unseating of the pilot valve and feathering control of the rate of fluid release is accomplished through further unseating of the pilot valve causing the poppet valve to unseat.

BRIEF DESCRIPTION OF THE DRAWING FIGURES

The invention will be more fully described in the following description in light of the drawing figures which include:

FIG. 1 showing a cross sectional view of a draft control valve in the draft control system environment;

FIG. 2 is a hydraulic schematic of the draft control system in a static mode;

FIG. 3 is a hydraulic schematic of the draft control system in a lifting mode;

FIG. 4 is hydraulic schematic of the draft control system in a lowering or discharging mode.

DETAILED DESCRIPTION OF THE INVENTION

Figure 1:
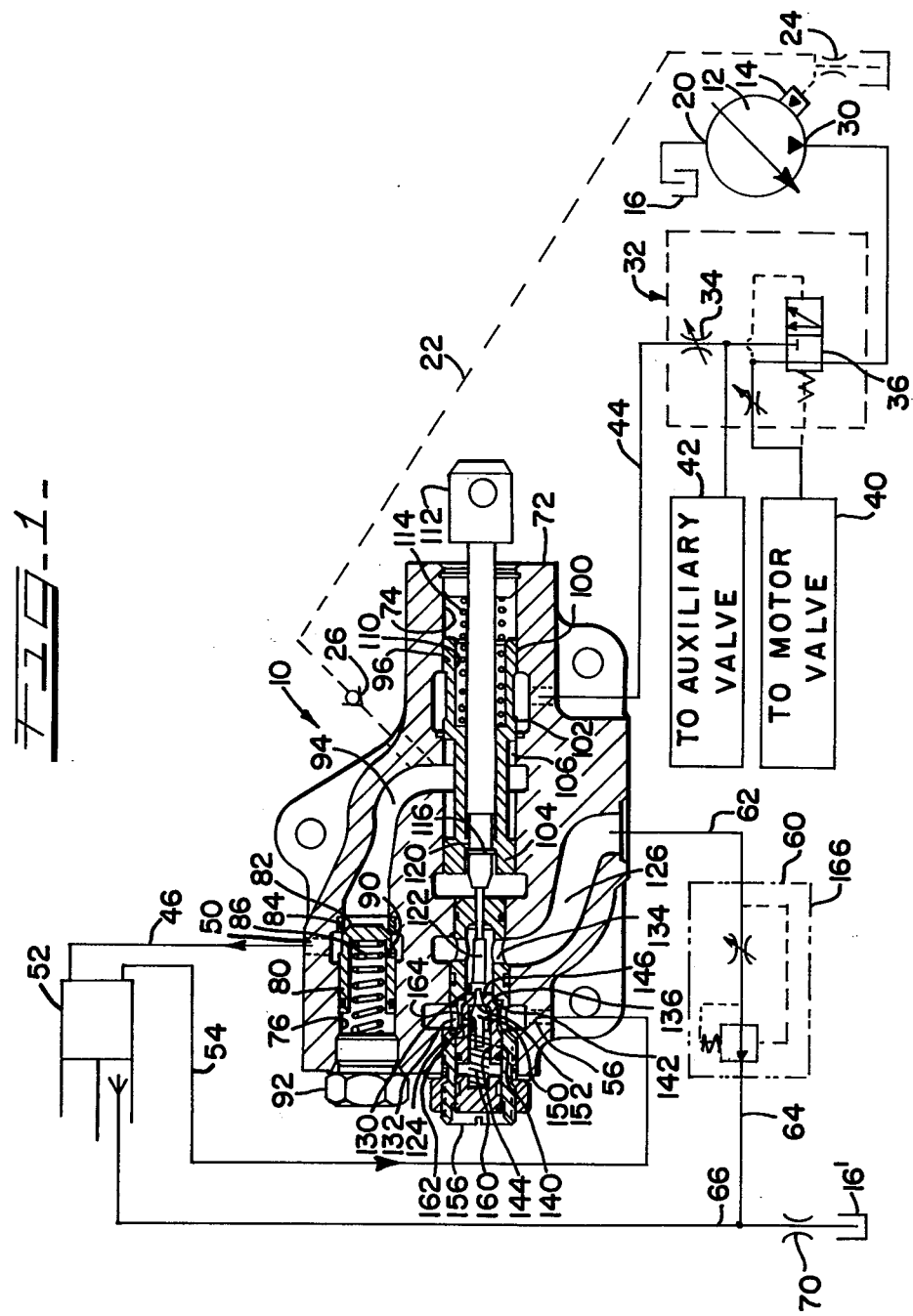

The draft control valve invention can be best visualized by examining FIG. 1 wherein the draft control valve, generally 10 is shown in the pressure and flow compensated draft control system environment. The environment includes the pressure and flow compensated variable displacement pump 12 which has an actuator 14 including a compensator as well as the usual source of fluid from sump 16 plumbed to the inlet port 20 of the pump 12. The pump 12 delivers at least a small amount of fluid at all times. A signal line 22 including a flow restricting orifice 24 and a check valve 26 connects the draft control valve generally 10 to the compensator 14 of the variable displacement pump 12. The pump outlet 30 delivers flow to a motor priority valve generally 32 which includes an action control valve or an adjustable orifice 34, a pressure activated valve 36 for directing flow normally to a motor valve 40 or alternatively to the motor valve 40 and circuits beyond including an auxiliary valve 42 and a draft control valve generally 10 downstream through first fluid supply passage 44. The pressure activated valve 36 is a spring biased spool valve biased to a first position and pilot operated to a second position. A third fluid supply passage 46 runs from delivery port 50 of the draft control valve outside the draft control valve housing to the draft control cylinder 52 while a first return passage 54 connects the draft control cylinder 52 or the outside of the draft control housing to the inlet return port 56 which leads eventually to the first longitudinal bore 74. A second return passage 126 leads from the first longitudinal bore to the outside of the housing.

A flow control action valve or drop rate control valve 60 is in communication with the draft control valve through conduit 62. A portion of the fluid passing though the flow control action valve 60 will pass via second conduit 64 to third conduit 66 either to the sump 16' or to lubricate the draft control cylinder 52. Orifice 70 meters the flow to the sump.

Looking specifically at the draft control valve generally 10 in more detail notice that the housing 72 is equipped with a plurality of bores and passages. A first longitudinal bore 74 has a plurality of diameters and passes through the entire length of the housing. A second longitudinal bore 76 accommodates an anti-leakdown check valve 80 having a valve face 82 capable of being urged to seat against first valve seat 84 by spring 86. The anti-leakdown check valve 80 also is provided with a central bore and a small orifice 90 in its body away from the face 82. This orifice allows fluid pressure on the draft control cylinder side of the valve, that is, the third fluid supply passage, to assist in maintaining it seated. A closure plug 92 seals one end of the second bore 76 and provides a stationary surface for anti-leakdown check valve spring 86.

Second fluid supply passage 94 allows communication between the first and second longitudinal bores 74 and 76 respectively.

A valve spool 96 is slidably carried in the first longitudinal bore 74 at the portion having access to the first supply passage 44 and the second fluid supply passage 94. The valve spool has first, second, third and fourth outside diameters 100, 102, 104 and 106 respectively, with the fourth being a lesser diameter than the other three. The first outside diameter 100 is at a first end of the valve spool and the third outside diameter is at a second end of the valve spool. A longitudinal bore 110 also passes through the interior of the valve spool and accommodates a slidable control rod 112 and a valve spool spring 114 therein. The control rod 112 may move laterally through the valve spool a small amount until the snap ring 116 carried by the control rod 112 contacts the internal land 120 of the valve spool. A push rod or extended probe 122 butts up against the inboard end of the control rod 112.

A valve accommodating insert 124 is threaded into the first longitudinal bore 74 at the portion thereof accommodating the first 54 and second 126 return passages. The valve accommodating insert 124 has several internal diameters in an internal bore 130, a first access aperture 132 for allowing communication between the first return passage 54 and the internal bore 130 and second access aperture 134 allowing communication between the second return passage 126 and the internal bore 130. A second valve seat 136 is machined in the internal bore 130 between the first and second access apertures 132 and 134.

A main poppet 140 is carried in the internal bore 130 of the valve accommodating insert 124. This poppet has a face 142 for engagement with the second valve seat 136 and a central longitudinal bore 144 with large and small diameters with the small diameter acting as a third valve seat 146. Inside the main poppet 142 in the longitudinal bore 144 thereof a pilot valve 150 is slidably carried. The pilot valve 150 has a body section and a tapered nose section 152 that projects through and partially out from the small diameter of the central longitudinal bore 144 and is spring loaded by pilot spring 160 to seat against third valve seat 146.

An adjustable end cap 156 is threaded into the valve accommodating insert 124 and provides a stationary surface to back up the pilot valve spring 160.

It can be seen that the push rod 122 contacting the inboard end of the control rod 112 extends into the internal bore 130 of the valve accommodating insert 124 and is aligned with the tapered nose section 152 of the pilot valve 150. Thus if the control rod is pushed inwardly sufficiently far it would unseat the nose of the pilot valve from its seat. The operation of the draft control valve system is shown in FIGS. 2 through 4 which are schematics of the draft control valve of FIG. 1.

FIG. 2 presents the draft control system in a neutral or static mode where fluid is not being delivered to the draft control cylinder 52. In this mode the draft control valve generally 10 is schematically shown to include the valve spool 96, the main poppet 140, the pilot valve 150, with its tapered nose 152, and the anti-leakdown check valve 80. Signal line 22 connects second fluid supply passage 94 to the actuator 14 of the pump 12. First fluid supply passage 44 is the source of fluid to the draft control valve, third fluid supply passage 46 is the input source of fluid to the draft control cylinder 52, first return passage 54 allows the escape of fluid from the draft control cylinder 52 when the main poppet 140 is opened and conduit 62 allows the exhausted fluid to eventually get to the sump 16'.

In this neutral mode a standby pump pressure of about 2.07MPa is maintained throughout the system. When the spool valve was closed on the previous cycle, pressure in the second fluid supply passage 94 was typically high. However, since no more fluid was required the pump has gone to standby pressure and the pressure in passage 94 has leaked down through orifice 24 to zero pressure. Fluid will be trapped in the draft control cylinder 52 as the anti-leakdown check valve 80 is closed due to the greater pressure on the back side of the valve accessed through the small orifice 90 in the body of the anti-leakdown check valve being greater than the decreased pressure in the second fluid supply passage 94 due to leakdown through the signal line 22. Passage through first return passage 54 is also blocked as the main poppet 140 is closed.

FIG. 3 shows the position of the draft control spool when the vehicle operator wishes to raise the implement supported by the vehicle through the extension of the draft control cylinder rod. The valve spool 96 has been shifted to open thus allowing fluid to flow from the pump 12 through the priority valve generally 32, through the first fluid supply passage 44, the valve spool 96, the second fluid supply passage 94 and the third fluid supply passage 46 to the draft control cylinder 52. As this increase in pressure in the second fluid supply passage increases, initially to the 2.07MPa standby pressure, the increase will signal the pump to stroke in its constant attempt to maintain a pressure of 2.07MPa greater than the pressure required by the system. The pump pressure will continue to increase until the anti-leakdown check valve 80 is unseated, i.e., pressure in the second fluid supply passage 94 exceeds pressure in the third fluid supply passage 46 and the draft control cylinder 52 and thereafter fluid delivered to the draft control cylinder will raise the load. The main poppet 140 will remain closed.

When it is desired to relieve fluid from the draft control cylinder 52 the situation in FIG. 4 is encountered. Here the control rod and the valve spool 96 is displaced by the operator inwardly to urge the pilot valve 150 off its seat. Prior to this action the pressure in the first access aperture 132 and on surface 162 of the main poppet 140 is the same as the pressure behind the main poppet as fluid may get behind the main poppet through the main poppet orifice 164. The pressure in the second access aperture 134 and the second return passage 126 is negligible. Thus when the pilot 150 is displaced to open passage across the third valve seat 146 fluid will rush out from behind the main poppet decreasing the fluid pressure behind the main poppet. The fluid pressure acting on the surface 162 of the main poppet 140 will be great enough to force the main poppet to be unseated as the pressure differential between the back side of the main poppet and the pressure on the surface 162 of the main poppet will be great enough to hold the main poppet open. Of course once the main poppet is open fluid may flow from the draft control cylinder 52 to the sump 16' through the drop rate control valve 60.

One of the unique aspects of this draft control valve is that both the main poppet 140 and the pilot valve 150 have tapered ends to provide throttling. As the pilot valve is unseated by the push rod 122 the main poppet 140 will follow so that a definite position of the push rod 112 will result in a definite position of the main poppet.

Another advantage provided by this invention is that the tapered end of the pilot valve 150 maintains fine control and the tapered end of the main poppet provides feathering. The clearance between the tapered end of the main poppet 140 and the valve seat, plus the angle of the taper, determine the throttling characteristics of the valve.

Thus it is apparent that there has been provided a draft control valve for use in a pressure and flow compensated system fulfilling the requirements of such a system and providing the advantages and objectives set forth above. Although a single embodiment of the invention has been described, it is expected that alternatives, modifications, and variations may be apparent to those skilled in the art as the result of study of the foregoing specification. Therefore this specification is intended to embrace all such alternatives and variations as fall within the spirit and broad scope of the appended claims.

What is claimed is:

1. A draft control valve for use in a closed center hydraulic system, said draft control valve comprising:
    a housing having a plurality of bores and passages including a first longitudinal bore having a plurality of diameters, a second bore having a plurality of diameters and a first valve seat, a first fluid supply passage, a second fluid supply passage, a third fluid supply passage, a first return passage and a second return passage;
    a first valve seat in said second fluid supply passage between said second fluid supply passage and said third fluid supply passage;
    a valve spool slidably carried in said first longitudinal bore;
    a control rod operatively connected to said valve spool;
    a valve accommodating insert positioned in said first longitudinal bore having an internal bore and a plurality of access apertures;
    a main poppet carried in said internal bore of said valve accommodating insert;
    a pilot valve carried in said internal bore of said valve accommodating insert spring loaded to close one of said access apertures;
    a push rod affixed to an inboard end of said control rod;
    an anti-leakdown check valve carried in said second longitudinal bore having a central bore providing access from said central bore to said third fluid supply passage.

2. The invention in accordance with claim 1 wherein said valve accommodating insert has a bore having several diameters, a first access aperture allowing communication between said first return passage and said bore in said valve accomodating insert, a second access aperture between said second return passage and said bore of said valve accommodating insert and a second valve seat in said bore between said first and said second access apertures.

3. The invention in accordance with claim 2 wherein said main poppet has a face for engagement with said second valve seat and a central longitudinal bore having large and small diameters, said small diameter acting as a third valve seat.

4. The invention in accordance with claim 3 wherein said pilot valve has a body section and a tapered nose section, said tapered nose section projecting through and out from said small diameter of said main poppet bore and spring loaded to seat against said third valve seat.

5. The invention in accordance with claim 1 wherein said anti-leakdown check valve has a valve face engageable with said first valve seat and an orifice passing through the body of said anti-leakdown check valve.

6. The draft control valve for use in a closed center hydraulic system, said draft control valve comprising:
    a housing having a plurality of bores and passages including a first longitudinal bore having a plurality of diameters passing through the length of said housing, a second longitudinal bore passing partway through said housing, a first fluid supply passage passing from the outside of said housing to said first longitudinal bore, a second fluid supply passage passing from said first longitudinal bore to said second longitudinal bore, a third fluid supply passage passing from said second longitudinal bore to the outside of said housing, a first return passage passing from the outside of said housing to said first longitudinal bore, and a second return passage passing from the first longitudinal bore to the outside of said housing;
    a first valve seat in said second fluid supply passage between said second fluid supply passage and said third fluid supply passage;
    a valve spool slidably carried in said first longitudinal bore at the portion thereof accommodating said first and said second fluid supply passages, said valve spool having a first outside diameter at a first end thereof, a second outside diameter dimensionally the same as said first outside diameter, a third outside diameter dimensionally the same as the first outside diameter at the second end of said spool, a fourth outside diameter between the second and third outside diameters dimensionally less than the first outside diameter, a longitudinal bore extending through said valve spool;
    a control rod slidably carried in said longitudinal bore of said valve spool;
    a valve accommodating insert threaded into said first longitudinal bore at the portion thereof accommodating said first and said second return passages, said valve accommodating insert having a bore having several diameters, a first access aperture allowing communication between said first return passage and said bore, a second access aperture allowing communication between said second return passage and said bore, a second valve seat in said bore between said first and said second access apertures;
    a main poppet carried in said bore of said valve accommodating insert, said main poppet having a face for engagement with said second valve seat, said main poppet having a central longitudinal bore having large and small diameters, said small diameter acting as a third valve seat;
    a pilot valve having a body section and a tapered nose section the body section carried in one diameter of said main poppet longitudinal bore and said tapered nose section projecting through and out from said small diameter of said bore while being spring loaded to seat against said third valve seat;

a push rod contacting the inboard end of said control rod and extending into said longitudinal bore of said valve accommodating insert capable of contacting said tapered nose of said pilot valve to urge said pilot valve off said third valve seat;

an adjustable end cap threaded into said valve accommodating insert bore;

an anti-leakdown check valve slidably carried in said second longitudinal bore, said anti-leakdown check valve having a central bore, a valve face engageable with said first valve seat, an orifice passing through the anti-leakdown check valve providing access from said central bore to said third fluid supply passage;

an anti-leakdown check valve spring carried in and extending out of said central bore;

a closure plug sealing the second longitudinal bore and contacting said anti-leakdown check valve spring to maintain said spring in a compressed state.

7. A draft control system for use on an agricultural tractor, said system comprising:

a variable displacement pump having an inlet port, an outlet port and a compensator having a pilot signal for effecting the displacement of said pump, said variable displacement pump delivering at least standby pressure at all times;

a motor valve;

a motor priority valve having an inlet port and a plurality of output ports and having a spool spring biased to a first position and pilot operated to a second position where at least standby pressure from said variable displacement pump is present at said motor at all times, said motor priority valve also including an adjustable orifice;

a closed center draft control valve having a first fluid supply passage connected to receive fluid from one of said output ports of said motor priority valve, second and third fluid supply passages for routing fluid from said first fluid supply passage to a delivery port, an inlet return port, a return delivery port, and a pilot operated poppet valve and passages between said inlet return port and said return delivery port;

a flow control action valve having an inlet port and an outlet port, said valve including a variable orifice and a pilot operated valve proportionally operated by pressure upstream and downstream of said variable orifice;

a cylinder having an inlet port receiving fluid to extend a piston in the cylinder from said delivery port of said closed center draft control valve and an oulet port for delivering fluid from the cylinder to said inlet return port of said closed center draft control valve when the piston in said cylinder is to be retracted.

8. The invention in accordance with claim 7 wherein said closed center draft control valve comprises:

a housing having a plurality of bores and passages including a first longitudinal bore having a plurality of diameters passing through the length of said housing, a second longitudinal bore passing partway through said housing, a first fluid supply passage passing from the outside of said housing to said first longitudinal bore, a second fluid supply passage passing from said first longitudinal bore to said second longitudinal bore, a third fluid supply passage passing from said second longitudinal bore to the outside of said housing, a first return passage passing from the outside of said housing to said first longitudinal bore, and a second return passage passing from the first longitudinal bore to the outside of said housing;

a first valve seat in said second fluid supply passage between said second fluid supply passage and said third fluid supply passage.

9. The invention in accordance with claim 7 wherein said valve accommodating insert has a bore having several diameters, a fixed axis aperture allowing communication between said first return passage and said bore in said valve accommodating insert, a second access aperture between said second return passage and said bore of said valve accommodating insert and a second valve seat in said bore between said first and said second axis apertures.

10. The invention in accordance with claim 9 wherein said main poppet has a face for engagement with said second valve seat and a central longitudinal bore has large and small diameters, said small diameter bore acting as a third valve seat.

11. The invention in accordance with claim 10 wherein said pilot valve has a body section and a tapered nose section, said tapered nose section projecting through and out from said small diameter of said main poppet bore and spring loaded to seat against said third valve seat.

12. The invention in accordance with claim 7 wherein said anti-leakdown check valve has a valve face engageable with said first valve seat and an orifice passing through the body of said anti-leakdown check valve.

13. The invention in accordance with claim 7 wherein said draft control valve comprises:

a housing having a plurality of bores and passages including a first longitudinal bore having a plurality of diameters passing through the length of said housing, a second longitudinal bore passing partway through said housing, a first fluid supply passage passing from the outside of said housing to said first longitudinal bore, a second fluid supply passage passing from said first longitudinal bore to said second longitudinal bore, a third fluid supply passage passing from said second longitudinal bore to the outside of said housing, a first return passage passing from the outside of said housing to said first longitudinal bore, and a second return passage passing from the first longitudinal bore to the outside of said housing;

a first valve seat in said second fluid supply passage between said second fluid supply passage and said third fluid supply passage;

a valve spool slidably carried in said first longitudinal bore at the portion thereof accommodating said first and said second fluid supply passages, said valve spool having a first outside diameter at a first end thereof, a second outside diameter dimensionally the same as said first outside diameter, a third outside diameter dimensionally the same as the first outside diameter at the second end of said spool, a fourth outside diameter between the second and third outside diameters dimensionally less than the first outside diameter, a longitudinal bore extending through said valve spool;

a control rod slidably carried in said longitudinal bore of said valve spool;

a valve accomodating insert threaded into said first longitudinal bore at the portion thereof accommodating said first and said second return passage, said valve accommodating insert having a bore having several diameters, a first access aperture allowing communication between said first return passage and said bore, a second access aperture allowing communication between said second return passage and said bore, a second valve seat in said bore between said first and said second access apertures;

a main poppet carried in said bore of sid valve accommodating insert, said main poppet having a face for engagement with said second valve seat, said main poppet having a central longitudinal bore having large and small diameters, said small diameter acting as a third valve seat;

a pilot valve having a body section and a tapered nose section the body section carried in one diameter of said main poppet longitudinal bore and said tapered nose section projecting through and out from said small diameter of said bore while being spring loaded to seat against said third valve seat;

a push rod contacting the inboard end of said control rod and extending into said longitudinal bore of said valve accommodating insert capable of contacting said tapered nose of said pilot valve to urge said pilot valve off said third valve seat;

an adjustable end cap threaded into said valve accommodating insert bore;

an anti-leakdown check valve slidably carried in said second longitudinal bore, said anti-leakdown check valve having a central bore, a valve face engageable with said first valve seat, an orifice passing through the anti-leakdown check valve providing access from said central bore to said third fluid supply passage;

an anti-leakdown check valve spring carried in and extending out of said central bore;

a closure plug sealing the second longitudinal bore and contacting said anti-leakdown check valve spring to maintain said spring in a compressed state.

* * * * *